United States Patent
Casanelles et al.

(10) Patent No.: US 8,855,817 B2
(45) Date of Patent: Oct. 7, 2014

(54) PARTS HANDLING DEVICE, SYSTEM AND METHOD

(75) Inventors: Ramon Casanelles, Barcelona (ES); Francisco Cortés Grau, Barcelona (ES)

(73) Assignee: ABB Research Ltd., Zürich (CH)

( * ) Notice: Subject to any disclaimer, the term of this patent is extended or adjusted under 35 U.S.C. 154(b) by 631 days.

(21) Appl. No.: 12/519,815

(22) PCT Filed: Dec. 19, 2007

(86) PCT No.: PCT/EP2007/064232
§ 371 (c)(1), (2), (4) Date: Jun. 18, 2009

(87) PCT Pub. No.: WO2008/074836
PCT Pub. Date: Jun. 26, 2008

(65) Prior Publication Data
US 2010/0036525 A1    Feb. 11, 2010

Related U.S. Application Data

(60) Provisional application No. 60/875,545, filed on Dec. 19, 2006.

(51) Int. Cl.
*B65G 61/00* (2006.01)
*B25J 17/02* (2006.01)

(52) U.S. Cl.
USPC ..... 700/248; 700/253; 414/744.5; 414/744.6; 414/749.1; 414/732; 414/738; 901/15; 901/16; 901/29; 901/40; 74/490.06

(58) Field of Classification Search
USPC ......... 700/248, 195, 245, 246, 247, 250, 253; 228/175; 318/568.1, 568.11; 219/121.64, 121.63; 414/795.4, 729, 414/744.5, 744.3, 744.2, 744.6, 749.1, 414/744.4, 917, 732, 738; 72/422; 901/30, 901/15, 49, 16, 27, 29, 40; 74/490.06, 68, 74/490.01, 490.05
See application file for complete search history.

(56) References Cited

U.S. PATENT DOCUMENTS 3,010,587 A * 11/1961 Hollinger .................. 414/744.5
3,363,474 A * 1/1968 Gott et al. .......................... 74/52
(Continued)

FOREIGN PATENT DOCUMENTS

EP    0666150 A1    8/1995
JP    4-56266 U     5/1992
(Continued)

OTHER PUBLICATIONS

PCT/ISA/210—International Search Report—May 6, 2008.
(Continued)

*Primary Examiner* — Ronnie Mancho
(74) *Attorney, Agent, or Firm* — Venable LLP; Eric J. Franklin

(57) ABSTRACT

A method for operating a system including at least two robots for handling parts and a robot control unit arranged for control of said at least two robots. Each of the robots is arranged with a parts handler device including a rigid arm with one end connected to the end element of an arm of the robot by a first swivel arranged for radial movement of the rigid arm in relation to the end element. Each of the robots is also arranged with a gripper connected to the rigid arm by a second swivel arranged for free, passive rotation of the gripper in relation to the rigid arm. The method includes generating instructions for the at least two robots to pick and/or move and/or place a part and sending the instructions to each robot simultaneously.

14 Claims, 5 Drawing Sheets

(56) References Cited

U.S. PATENT DOCUMENTS

| | | | |
|---|---|---|---|
| 4,661,040 A * | 4/1987 | Cigna | 414/744.5 |
| 4,921,395 A * | 5/1990 | Sahlin | 414/744.3 |
| 4,989,444 A * | 2/1991 | Murakami et al. | 72/422 |
| 5,017,083 A * | 5/1991 | Sahlin | 414/744.3 |
| 5,380,978 A * | 1/1995 | Pryor | 219/121.64 |
| 5,528,505 A * | 6/1996 | Granger et al. | 700/195 |
| 5,580,209 A * | 12/1996 | Ogawa et al. | 414/729 |
| 6,153,853 A * | 11/2000 | Maruyama et al. | 219/121.63 |
| 6,155,768 A * | 12/2000 | Bacchi et al. | 414/416.03 |
| 6,421,893 B1 * | 7/2002 | Katayama et al. | 29/33 K |
| 6,467,675 B1 * | 10/2002 | Ozaku et al. | 228/175 |
| 7,571,025 B2 * | 8/2009 | Bischoff | 700/248 |
| 2004/0240981 A1 * | 12/2004 | Dothan et al. | 414/795.4 |
| 2006/0999064 | 5/2006 | Anaki et al. | |
| 2007/0207026 A1 | 9/2007 | Grau et al. | |

FOREIGN PATENT DOCUMENTS

| | | |
|---|---|---|
| JP | 06-262553 | 9/1994 |
| JP | 07-299774 | 11/1995 |
| JP | 2001030190 A | 2/2001 |
| JP | 2003513813 A | 4/2003 |
| JP | 2004-337918 A | 12/2004 |
| JP | 2004344899 A | 12/2004 |
| JP | 2005131694 A | 5/2005 |
| JP | 2005230995 A | 9/2005 |
| JP | 2005262369 A | 9/2005 |
| JP | 2006009727 A | 1/2006 |
| JP | 2006123009 A | 5/2006 |
| JP | 2006-187826 A | 7/2006 |
| JP | 2009019877 A | 1/2009 |
| WO | WO-01/36165 A1 | 5/2001 |
| WO | WO-2006/018459 A1 | 2/2006 |

OTHER PUBLICATIONS

PCT/ISA/237—Written Opinion of the International Searching Authority—May 6, 2008.
PCT/IPEA/409—International Preliminary Report on Patentability—Apr. 8, 2009.
Translated Japanese First Office Action—Mar. 19, 2013 (Issued in Patent Application No. 2013-043194).
Japanese Final Office Action (With Translation)—Oct. 22, 2013 (Issued in Counterpart Application No. 2012-043194).

* cited by examiner

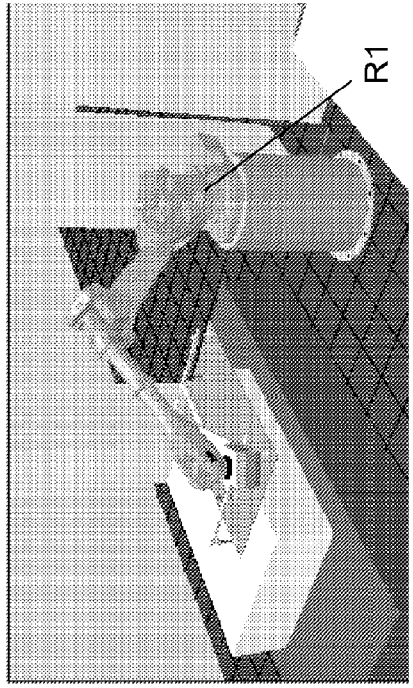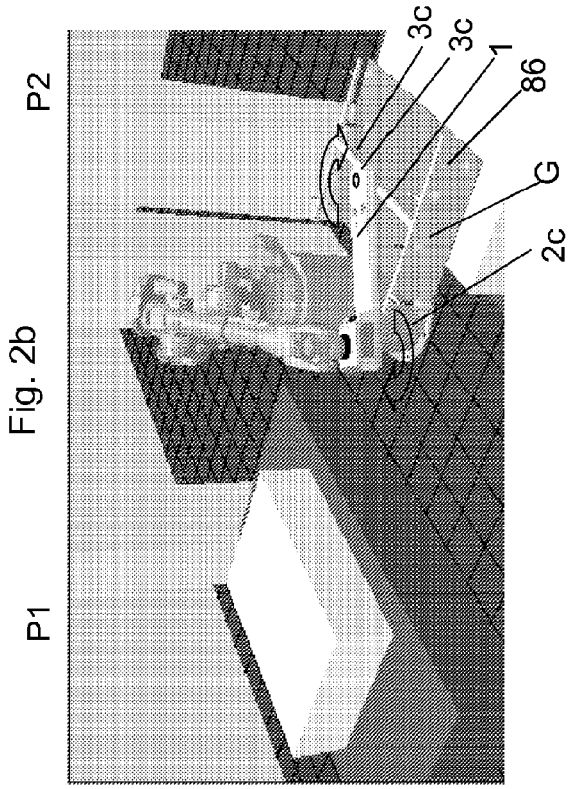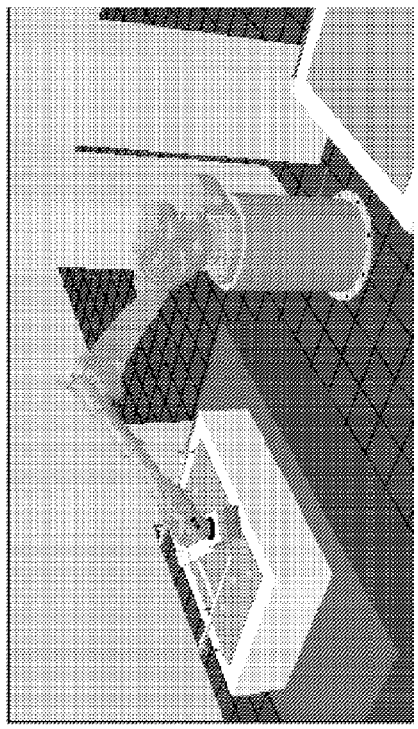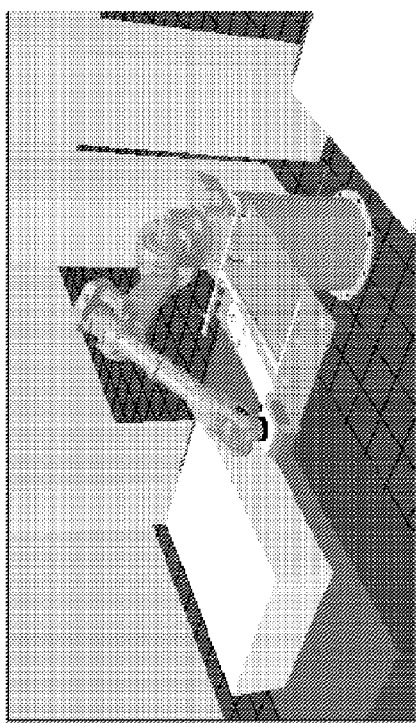
Fig. 2a
Fig. 2b
Fig. 2c
Fig. 2d
Fig 2a-d

PARTS HANDLING DEVICE, SYSTEM AND METHOD

CROSS-REFERENCE TO RELATED APPLICATIONS

This application claims priority to U.S. provisional patent application 60/875,545 filed 19 Dec. 2006 is the national phase under 35 U.S.C. §371 of PCT/EP2007/064232 filed 19 Dec. 2007.

TECHNICAL FIELD.

The present invention relates to a device used to handle parts, for example for loading and unloading parts onto a press line. The device is intended to be coupled to an industrial handler, such as an articulated robot, so as to provide a kinetic chain between a base of an industrial handler or robot and an end element such as a gripper.

BACKGROUND ART

Currently various types of industrial handlers are known to be used in a broad range of applications. For example, it is common to use robots and other handlers on press lines used to manufacture vehicle bodywork parts. The industrial handlers are used to carry out tasks such as loading and unloading the parts between one press and another, or a store room and a press, conveyor belt and a press etc.

One type of handler which is frequently used because of its ability to adapt to a great variety of different movements and cycles, is articulated robots, for example robots with four or six degrees of freedom; each degree of freedom is an independent movement (turn or displacement) that one articulation can make with respect to the preceding one. Another type of handler used on press lines are the so-called "Doppins", which generally consist of a structure attached to the press and equipped with a guide on which a cart travels vertically; the cart is fitted with a system of articulated arms, which is responsible for the movement of entering and exiting the press for loading or unloading parts.

On all handlers, an end element is installed on the system's free end, which in the case of press automation is a gripping element adapted to the parts to be loaded and unloaded; this gripping element is usually called a "gripper", and can use either a mechanical, electromagnetic or vacuum gripping system, depending on each case's specific requirements.

There may be different handling configurations between one station and another of a press line: for example, a single handler that extracts the part from one station and introduces it into another one, or a pair of handlers, one for unloading from one station and another one for loading it onto the following station, with or without the interposition of conveyor belts, rotary mechanisms, etc.

In most cases, on press lines, as in most industrial operations, it is advisable to minimise cycle times; where handlers are concerned, an important part of the cycle is the extraction or insertion of the part in relation to the press's area of influence, since during this phase the press must remain open, and therefore, inactive; consequently, it is advisable to extract and insert the part quickly.

What follows is a discussion of this problem, by way of example, with reference to an articulated robot that extracts a part from one press and inserts it into the following one. There are basically two cycles that an articulated six-axis robot, with a gripper attached to its sixth axis, can perform for this operation. In one cycle, usually called the "external" cycle, the robot first extracts the gripper holding the part from the press following a rectilinear trajectory in parallel to the press line, through combined turns around the first three axes; secondly, it makes the gripper turn with regard to the $4^{th}$ and $6^{th}$ axes to leave it facing the following press; and finally, it inserts the part into the press following a rectilinear trajectory.

The advantage of this type of cycle is that the partial extraction and insertion times are relatively short, because the movements are linear; however, the overall cycle time is fairly long. In an alternative cycle, usually called an "internal" cycle, which can be seen in FIG. 1, the robot maintains its arm extended and through simultaneous turns with regard to the $1^{st}$ and $6^{th}$ axes makes the gripper with the part perform a single movement with a trajectory, essentially horizontal, which occurs between the $6^{th}$ axis and the base of the robot; however, due to the rotation around the $6^{th}$ axis, the part turns during the extraction and the insertion in the presses.

The overall cycle time in this case is relatively small, due to the fact that the robot performs a single movement; however, the partial extraction and insertion times for the parts are high, because the part's turn makes a section of it remain longer under the press. Another inconvenience of turning the part during the extraction and the insertion in the presses is that the obstacles represented by the press columns themselves must be taken into account, which can make the gripper's turning with the part difficult.

Thus conventional solutions for loading and unloading from presses present limitations when it comes to in reducing cycle times. Moreover, in both cases, the part is turned 180° when passing from one press to another. FIG. 3 (prior art) shows such a known method. The figure shows a robot R which transfers a part from a first press to a second press. Rotation of the part around the robot sixth axis enables the part to be inserted in the second press, but the part has to be turned through 180° in order to do this.

In recent years, some devices or accessories have been proposed intended to be coupled with the $6^{th}$ axis of an articulated robot, which partially resolve these problems. European patent application EP666150A1, entitled Wrist structure for articulated robots, assigned to Yaskawa, describes a mechanism that is coupled to the robot's wrist and displaces the turn of the $6^{th}$ axis to the end of a rigid bar. This mechanism makes it possible to maintain the part's orientation as it passes from one press to another, and makes a linear extraction and insertion movement; however, the robot is forced to retract considerably for this movement, which makes it fairly slow, especially if the distance between presses is large. Another inconvenience of this mechanism is that, due to the fact that there is no possibility of turn around the robot's $6^{th}$ axis, to enter the press laterally the bar must be fairly long, and this causes problems of weight, rigidity and similar.

Another known device includes two bars articulated to each other by their ends; a first bar is coupled by its other end to the robot's $6^{th}$ axis, while the other end of the second bar is coupled to the gripper for the part to be handled. There is a motor on the articulation between the two bars, which makes it possible to action the gripper's rotation in relation to the second bar. This system makes it possible to transfer the part with an internal turn, such as the one represented in FIG. 1, but with linear extraction and insertion into the presses, since the combination of rotations around the different axes makes it possible to rotate the gripper holding the part in the opposite sense to the robot arm's turn during the phases of extraction or insertion, thus maintaining the part's orientation, and performing an approximately linear movement between one press and another. Nonetheless, this system is relatively complex, because it implies two bars articulated to each other, with the ensuing inconveniences concerning the assembly's rigidity.

At the same time, and irrespective of the robot's movements, it is also advisable to ensure that the gripper is of limited height, in order to be able to partially overlap the press's opening and closing movements with the part's insertion and extraction; and it is also desirable, in terms of safety and savings, that the gripper and any other part of the handler which penetrates within the press's area of influence are made of light low-hardness materials, compatible with their function, in order to minimise as much as possible any damage to the press in the event of an accident. In the described system with two articulated bars, the rigidity requirements make it difficult to reduce the height of the assembly; moreover, the articulation with the motor penetrates within the press's area of influence, with the consequent risk of significant damage in the event of an accident.

An industrial handler is disclosed in WO2006/018459, entitled Part-handling device and industrial handler comprising said device, to ABB, which describes a device intended to be coupled to an industrial handler that presents a kinetic chain between a base and an end element. The device comprises: a rigid arm, which is designed to be linked to the handler's end element; a support which is mounted to the rigid arm so that it can move and which is designed to be rigidly coupled to an element for gripping the parts to be handled; and a motor or other means for actuating the movement of the support in relation to the arm. The part is turned through 180° before entering the second or following press.

SUMMARY OF THE INVENTION

The aim of the present invention is to provide an improved device for handling parts. This and other aims are obtained by a device method, and a system.

In a first aspect of the invention an improved parts handler device is provided for handling parts, said device intended for coupling a said part to a first of two industrial handlers and form a kinetic chain between a base of said industrial handler and an end element of said industrial handler comprising gripper means, wherein said parts handler device comprises a rigid arm, designed to be connected to the end element of the arm of the industrial handler; and a swivel means for radial movement of the rigid arm in relation to the end element of said industrial handler.

US2006/099064 discloses an on-the-fly robotic system and method for unloading glass sheets of mixed sizes, including jumbo-sized sheets, from or onto a conveyor onto or from unloading platforms. The system comprises at least one traverse unit extending along the conveyor in parallel to the longitudinal axis thereof and at least two programmable industrial robots movably mounted on the traverse unit.

According to an embodiment of the invention, an improved parts handler device is provided for handling parts, said device intended for coupling a said part to a first of two industrial handlers, where said parts handler device comprises a swivel means for radial movement of the rigid arm in relation to the end element of said industrial handler and wherein the swivel means is arranged for free radial movement or rotation of the rigid arm relative the robot arm about an axis.

According to an embodiment of the invention, an improved parts handler device is provided for handling parts, said device intended for coupling a said part to a first of two industrial handlers and form a kinetic chain between a base of said industrial handler and an end element of said industrial handler comprising gripper means, and wherein the handling device is joined to the gripper means or a gripper arrangement by a second swivel means arranged for free radial movement or rotation of the rigid arm relative the gripper means or gripper arrangement.

According to another embodiment of the invention, an improved parts handler device is provided for handling parts, said device intended for coupling a said part to a first of two industrial handlers, where said parts handler device comprises a swivel means wherein a first swivel means is arranged for free radial movement or rotation.

According to an embodiment of the invention, an improved parts handler device is provided for handling parts, said device intended for coupling a said part to a first of two industrial handlers, where said parts handler device comprises a swivel means wherein a second swivel means is arranged for free radial movement or rotation about a sixth and substantially vertical axis.

According to another embodiment of the invention, an improved parts handler device is provided for handling parts, said device intended for coupling a said part to a first of two industrial handlers, where said parts handler device comprises a swivel means wherein the swivel means is arranged for free radial movement or rotation about a seventh and substantially vertical axis.

According to an embodiment of the invention, an improved parts handler device is provided for handling parts, said device intended for coupling a said part to a first of two industrial handlers and form a kinetic chain between a base of said industrial handler and an end element of said industrial handler comprising gripper means, and wherein the handling device, or the gripper means or gripper arrangement of each robot are linked by an additional cross member joined to each handling device or to both gripper arrangements.

According to an embodiment of the invention, an improved parts handler device is provided for handling parts, said device intended for coupling a said part to a first of two industrial handlers and form a kinetic chain between a base of said industrial handler and an end element of said industrial handler comprising gripper means, and wherein the handling device, or the gripper means or gripper arrangement of each robot are linked by an additional cross member joined to each handling device or to both gripper arrangements and wherein the cross member is arranged joined to each gripper means or gripper arrangement with a swivel joint.

In line with the above aim, in a first aspect, this invention relates to a device used for handling parts, intended to be coupled to an industrial handler that provides a kinetic chain between a base of the robot or industrial handler, and an end element, characterised in that that said parts handler device comprises: a rigid arm, which is designed to be linked at one end to the industrial handlers end element; with a means for allowing rotation of one end of the rigid arm around an axis arranged at the handlers end element, where the other end of the rigid arm is arranged attached to a gripper arrangement.

The device's characteristics make it possible to provide the parts handler with an additional degree of freedom, through which the parts can be extracted and inserted into work stations, such as presses, with a linear movement, and consequently in a reduced time, in a manner also compatible with a reduced overall time; moreover, this is done in a mechanically simple and reliable way, with the possibility of avoiding the penetration of very hard or voluminous parts inside the work stations.

Preferably, the rigid arm is designed to rotate in cooperation with the industrial handler's end element; in this way, the part may be moved along a path parallel to the line that joints the presses during the handler's traversing movement from one press to another.

In a first embodiment, the rigid arm of the improved parts handler is mounted to the gripper or gripper arrangement allowing a rotational movement. The gripper arrangement turns with respect to the rigid arm of the improved parts handler and the rigid arm turns with respect to the industrial handler or robot arm this jointed rigid arm makes it possible for the gripper holding the part to maintain the orientation of the part during the movement of the industrial handler's end element. The movement of the industrial handlers end element from one press to the next press describes, at least in part, a circular arc during transfer of the part: but the part moves along a straight line. In this embodiment, the rigid arm may be coupled on the end opposite the gripper or gripper arrangement to the industrial handler's end element with a swivel means or joint allowing free rotation about a vertical axis.

The invention also refers to at least one industrial handler which presents a kinetic chain between a base and an end element of the industrial handler or robot, characterised in that that it comprises a device of the type described above, linked to said end element. Preferably, the industrial handler comprises an articulated robot of at least two axes. The industrial robot may also comprise up to 5 or 6 axes.

The invention may use two standard robots to transfer the part, in a movement in which the robots should move synchronized, using a robot control unit or system suitably arranged for simultaneous control of more than one robot or industrial handler. By means of the improved part handling device, the two robots can transfer the part along a linear path between presses with no rotation, and thereby save cycle time because of the "clean" and linear movement. The principal advantage is a reduced cycle time enabled by a straight and linear path. The improved parts handler mounted one on each of two cooperating robots allows the part to be moved along the most optimal path: a straight line, between the first and second press.

Another advantage is faster acceleration and braking of the part during transfer from one press to the next. This provided because a) payload is shared between two robots, and thus more power is available and higher speeds and accelerations can be achieved; and b) a relatively high stiffness or rigidity for the system of the handled part held by two robots when compared to a single robot system. This is because a single robot holds the part from the middle and requires a stiff and heavy gripper to avoid vibration during handling and acceleration. By means of the described, improved rigidity is provided by holding the part at both ends. Acceleration, maximum speed and braking can be increased relative to prior art devices without increasing vibration.

In addition the improved parts handler in does not require any motor or actuator in its basic embodiment, which reduces the need for maintenance. There is a vertical free rotating axis on the first end of the parts handler arranged relative to at the end element of the industrial handler. All displacement and reorientation movements can be done by moving both robots coordinated.

The part acts as a mechanical link between robots. This link is removed when robots leave the part in one press and return empty to take the next part. In this case, a connecting bar may optionally be mounted between robots, or between the gripper arrangements, or/and a system to move the grippers back to the original position or a home position, or a procedure with sensors or similar for calibrating or synchronizing the robots position and/or speed.

The use of standard robots as industrial handlers and an existing robot control unit arranged for controlling a plurality of robots simultaneously reduces the need for robot control or robot path programming developments. The use of existing machines also increases the reliability of systems which comprise both known machines and an improved parts handler.

BRIEF DESCRIPTION OF THE DRAWINGS

A more complete understanding of the method and system of the present invention may be had by reference to the following detailed description when taken in conjunction with the accompanying drawings which, schematically and only by way of a non-restrictive illustration, represent a practical embodiment of the invention. In the drawings:

FIG. 2 shows a sequence of views from a simulation of a movement of the part handling device, FIG. 3 (prior art) shows a known handling sequence for one robot handling a part.

DESCRIPTION OF THE PREFERRED EMBODIMENTS

Figure 3:
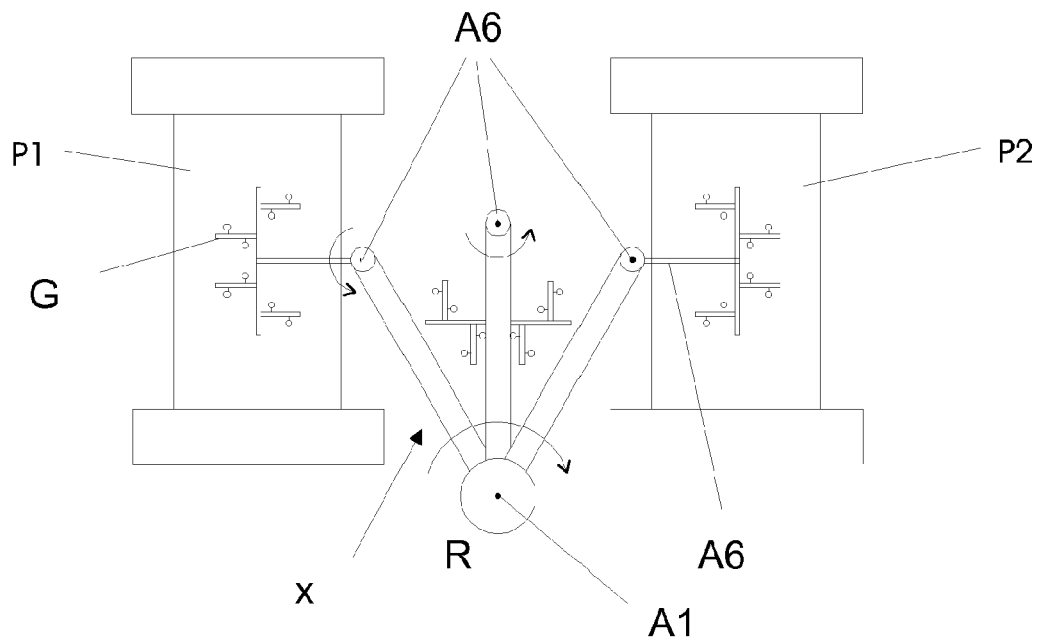
Figure 1:
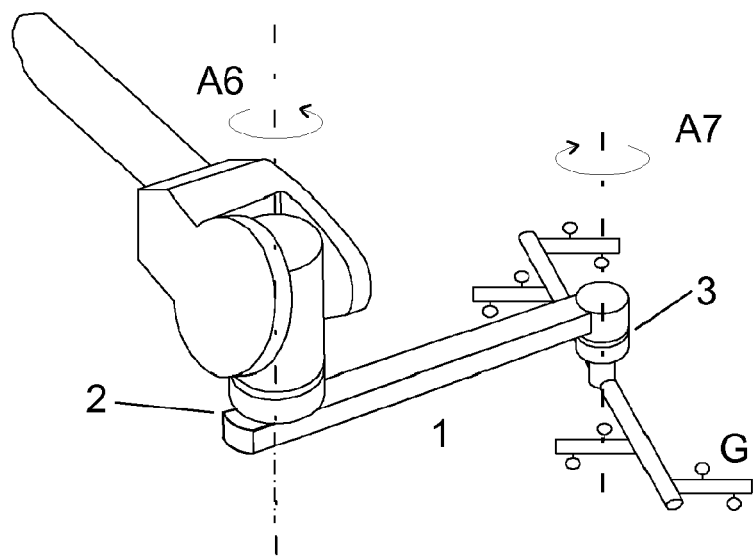
FIG. 1 shows in a simplified diagram an improved parts handler according to an embodiment of an aspect of the invention.

FIG. 1 shows in a simplified diagram the end element of an industrial handler, or robot, with the sixth axis A6 indicated in this example along a vertical axis. An improved parts handler 1 is shown comprising a rigid bar or arm with one end arranged fastened to an end element of the industrial robot or handler by a second swivel or joint means 2, allowing free rotation about axis A6.

At the other end of the rigid bar is arranged a gripper G or gripper arrangement by means of a swivel or joint means 3. Rotation of the gripper arrangement is arranged about a vertical axis shown here as A7.

Figure 5:
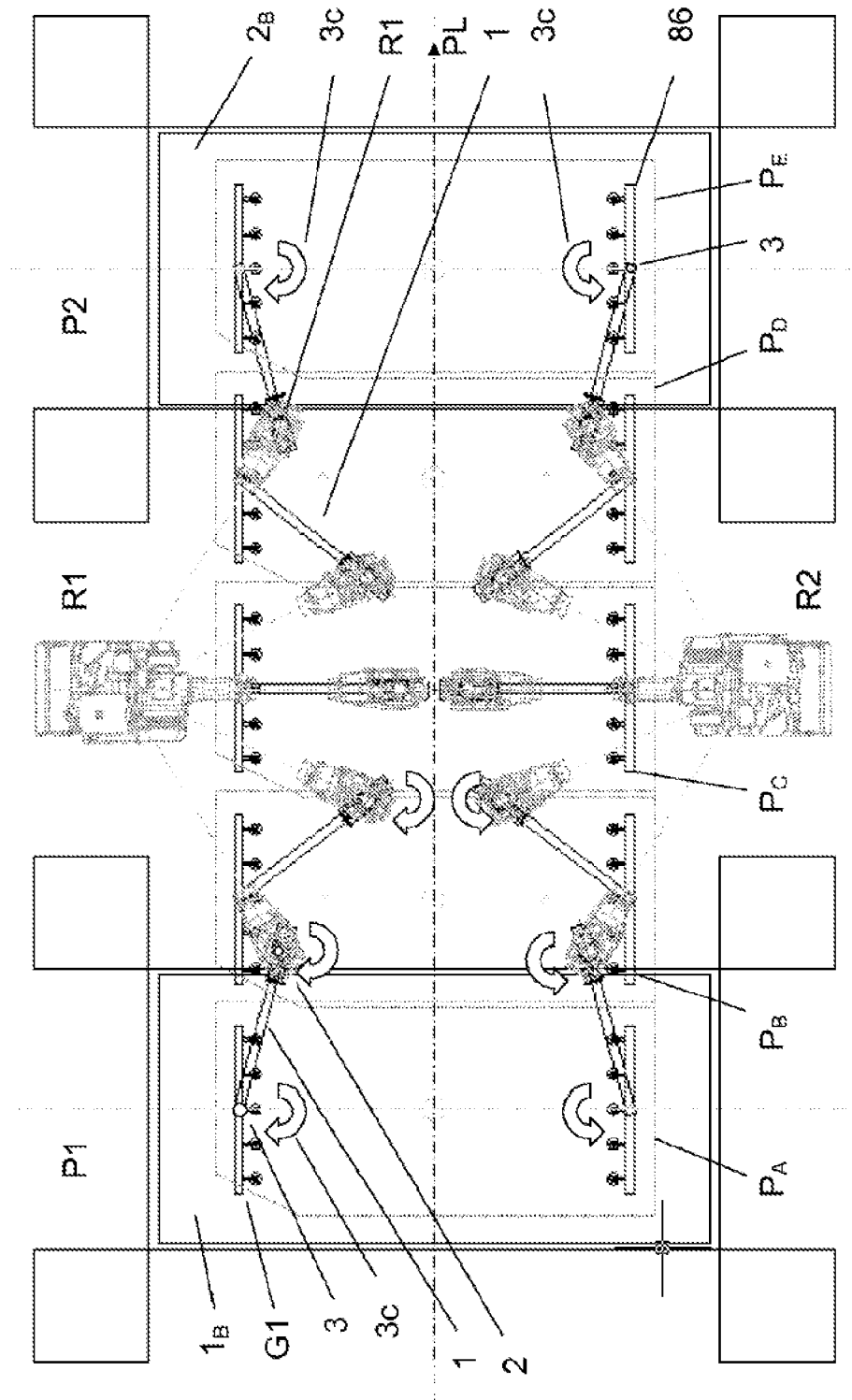
FIG. 5 shows in a simplified diagram a system comprising two industrial handlers each arranged with a part handling device according to an embodiment of the invention.
Figure 6:
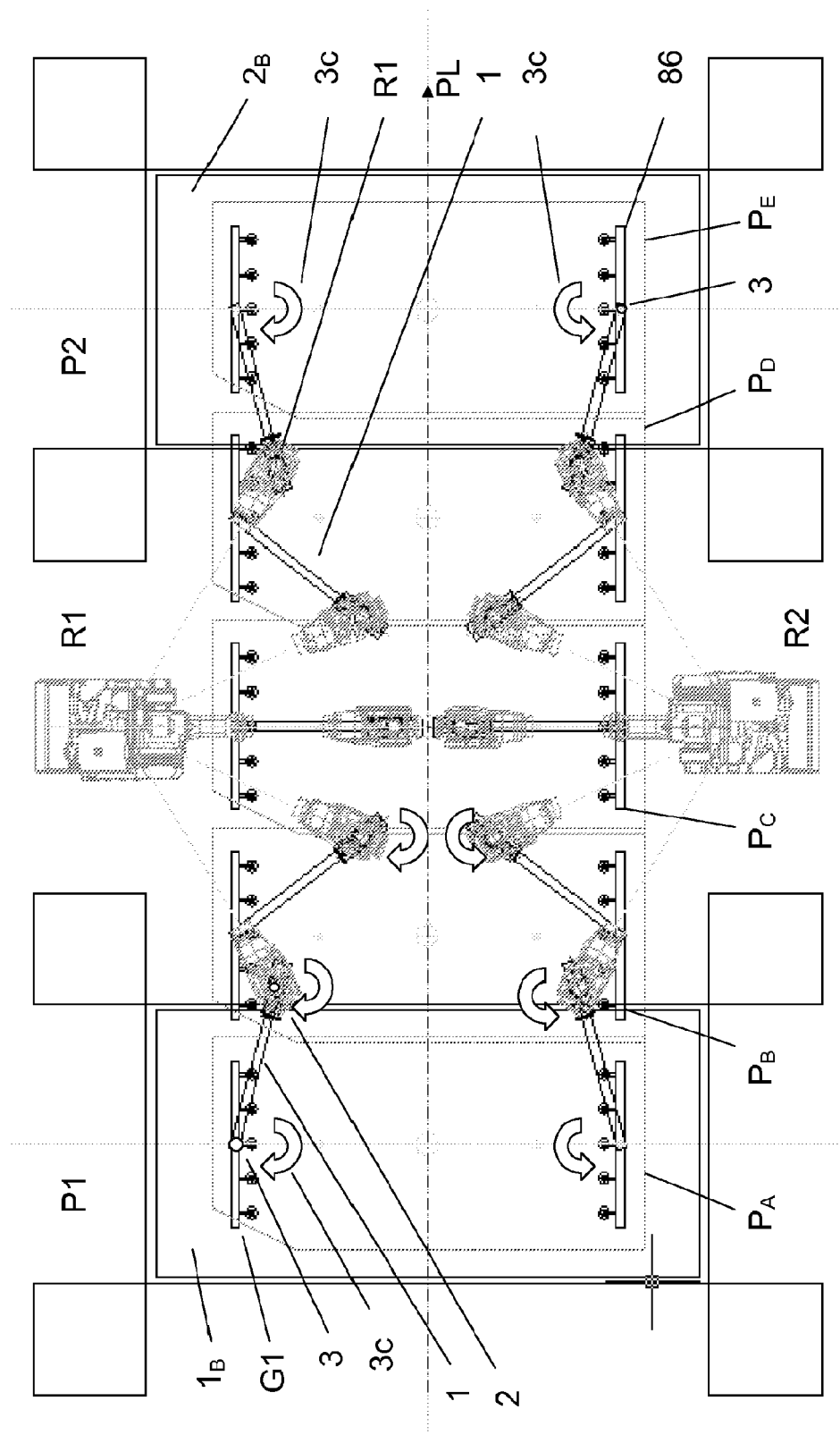

FIG. 5 shows a schematic diagram of a system such as a press line arranged with the improved parts handler device according to a first aspect of the invention. The diagram shows a first press P1 and a second press P2, and the press line direction PL which is the direction that parts travel between the presses. Two robots R1 and R2 are arranged in between the two presses P1, P2. Each robot is arranged with an improved parts handler 1 comprising a rigid bar, a first swivel means 2 and a second orientation or displacement means 3. In this diagram, the second means 3 is shown arranged to rotate in a clockwise 3c direction. The second means 3 may also rotate in an anticlockwise direction (not shown) if so required.

The diagram also shows five successive positions of a part, which are $P_A$ the starting position with a part in place on the press bed of P1. At position $P_B$ the part has been picked up and is moving in a straight line parallel to press line direction PL. At position $P_C$ the improved parts handler 1 and the robot arm may momentarily be aligned parallel and the improved parts handler 1 is in this exemplary diagram rotated up to a maximum of 90° to the press line direction PL. In the diagram the full robot arm has been omitted for the purpose of clarity in the drawing and the end element of the robot arm only shown.

At position $P_D$ the part has reached a point after which it is inserted in the second press P2. $P_E$ shows the part in place in the second press P2 on the press bed $2_B$. Note that the gripper arrangement G is inserted into the press but that the robot and most of the improved handler device remains outside of the press.

The invention achieves a transfer in a straight line and without turning the part, neither turning on extraction nor turning through 180° as described, for example, in WO2006/018459. The invention may use two standard industrial robots to transfer the part, however, the two robots should move in a synchronized way. This is achieved by using a robot control unit that is arranged suitable for controlling more than one robot at a time, such as a MultiMove robot controller supplied by ABB.

In the sequence described of transferring the part between press P1 and press P2 the part is arranged to act as a mechanical link between the two robots by means of the rigid bar and two joints 2, 3 of the improved parts handler. This link is lost when robots leave the part in one press and return empty to take the next one from press P1, which may be remedied either by the addition of a connecting bar between the robots, or/and or and/by moving the gripper back to its original position or/and by arranging for a synchronisation or calibration action before picking up the next part.

FIG. 2 shows a sequence of simulation diagrams for the device which is illustrated with only one robot for the purpose of simplicity of the graphic, and not to illustrate or suggest an actual single-robot embodiment. FIG. 2a shows a robot holding the device attached to a gripper arrangement. FIG. 2b shows the robot R1 moving the part and gripper device from Pl and towards P2. In FIG. 2c we can see that the device has rotated some 45 degrees or so around an axis at the end element of the robot arm corresponding to joint 2 in FIG. 1 and also rotated about the joint corresponding to the second orientation or displacement means, joint 3, in FIG. 1. FIG. 2d shows the part in entering press P2 with a clockwise rotation indicated by arrows 2c, 3c.

As mentioned above, the invention may use two standard industrial robots to transfer the part which is arranged to act as a mechanical link between the two robots. It is important that the two robots move in a synchronized way, which is best achieved by controlling the robots with a robot control unit arranged suitable for controlling more than one robot at a time.

Figure 4:
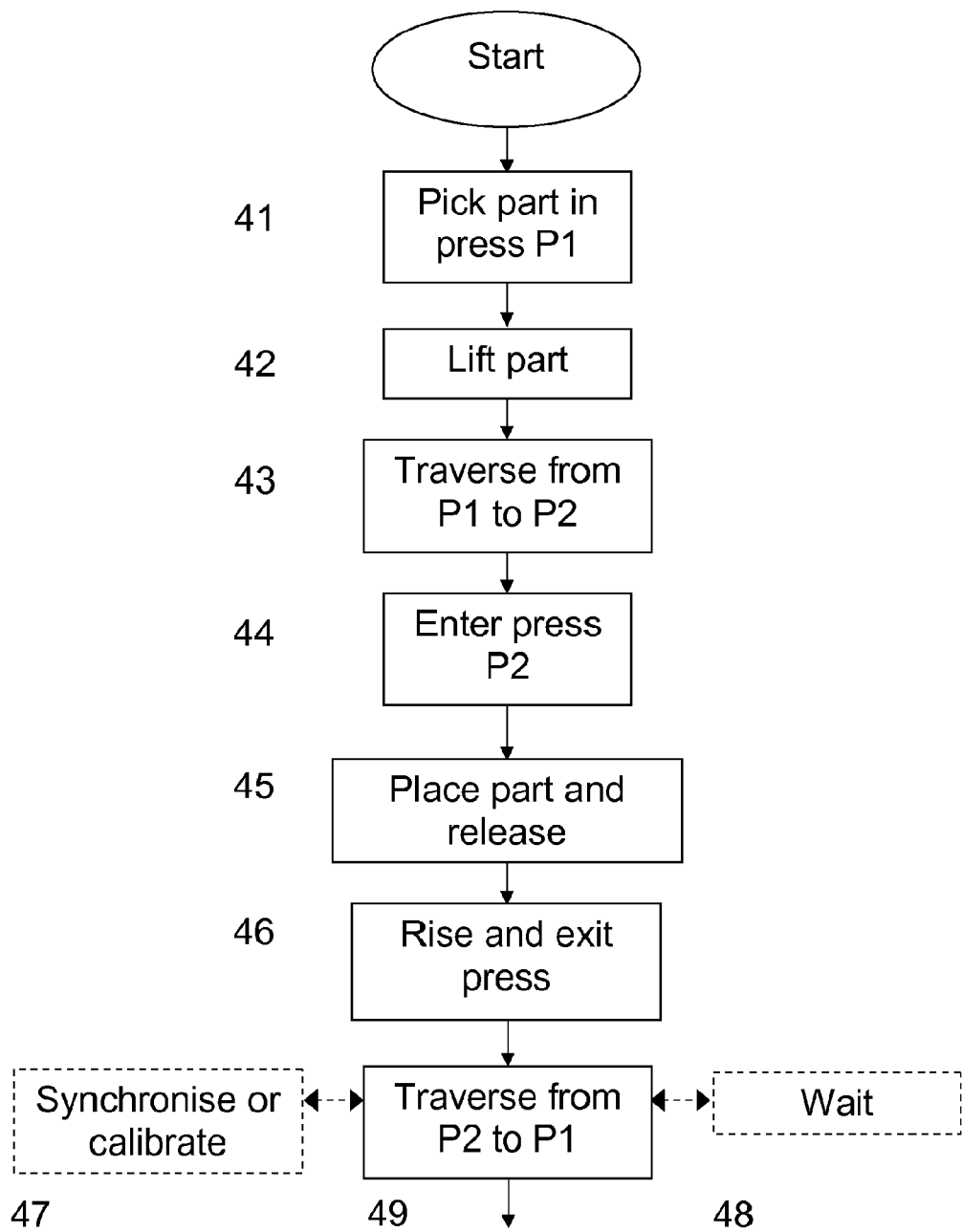
FIG. 4 shows a flowchart for a method of operating a system comprising two industrial handlers or each robots equipped with a part handling device according to an embodiment of the invention.

FIG. 4 shows a flowchart for a control method for a system of two presses, two industrial handlers each equipped with an improved parts handler and a part, according another aspect of the invention. In the method, the same instruction is given to each of the two robots R1, R2 by a robot control unit or RCU arranged capable of controlling more than one robot simultaneously. The flowchart for a control method shows the following blocks:

41. Pick part in press P1; the part is gripped by the grippers which are held by each robot using a part handler 1 arranged at the end of the robot arm eg on axis 6,
42. Lift part; the two robots lift the part simultaneously with a movement of eg axis A6,
43. Traverse from P1 to P2; the two robots move the part from first press P1 to second press P2 moving simultaneously with a movement, rotation, of eg axis A1. The part follows a straight and horizontal line parallel to the press line direction PL. Each parts handler 1 between each robot and each gripper G or gripper arrangement is arranged for rotation about a vertical axis A6 and A7 displacing the part in a lateral direction relative each robot arm and allowing the part held by the two robots to move in a straight line. The end element of robot arm of the two robots, axis 6, follows a path that is, at least in part, not parallel to the press line.
44. Enter press P2; the two robots move the part into second press P2, which may optionally be preceded by a wait state if necessary,
45. Place part and release; the two robots lower or place the part in position in press P2,
46. Rise and exit press; the robots lift up the empty gripper and retracts it from the second press P2,
47. Synchronise or calibrate; an optional calibration stage may take place after dropping the part in press P2 and before picking up the next part in press P1,
48. Traverse from P2 to P1; the robots move simultaneously back toward press P1, synchronisation or calibration may take place during this stage,
49. Wait; movement of the gripper by the robot into press P1 may optionally be preceded by a wait state if necessary.

Thus the path of the robot arm end element may in part follow a circular path with a centre of rotation about each robots axis A1, but the part follows a straight line parallel to the press line direction PL.

Preferably at least one robot is a standard industrial robot comprising at least two axes. This robot may be an industrial handler such as the industrial handler described in WO2006/018459 to ABB, which description is hereby incorporated in this description in its entirety by means of this reference.

Another object of the present invention is to provide an improved computer program product and a computer readable medium having a program recorded thereon.

Methods of the invention may be supervised, controlled or carried out by one or more computer programs. One or more microprocessors (or processors or computers) comprise a central processing unit CPU connected to or comprised in the robot control unit described herein, which processors, PLCs or computers perform the steps of the methods according to one or more aspects of the invention, as described for example with reference to FIG. 4. It is to be understood that the computer programs for carrying out methods according to the invention may also be run on one or more general purpose industrial microprocessors or PLCs or computers instead of one or more specially adapted computers or processors.

The computer program comprises computer program code elements or software code portions that make the computer or processor perform the methods using equations, algorithms, data, stored values, calculations, synchronisations and the like for the methods previously described, and for example in relation to the flowchart of FIG. 4. A part of the program may be stored in a processor as above, but also in a ROM, RAM, PROM, EPROM or EEPROM chip or similar memory means. The or some of the programs in part or in whole may also be stored locally (or centrally) on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as Sony memory stick (TM), a USB memory stick and other removable flash memories, hard drives etc. may also be used. The program may also in part be supplied or updated from a data network, including a public network such as the Internet.

It should be noted that while the above describes exemplifying embodiments of the invention, there are several variations and modifications which may be made to the disclosed solution without departing from the scope of the present invention as defined in the appended claims.

The invention claimed is:

1. A method for operating a system comprising at least two robots for handling parts and a robot control unit arranged for control of said at least two robots, each of said robots being arranged with a parts handler device comprising a rigid arm with one end connected to the respective robot for a first rotational movement about a first axis, the first rotational movement being controlled by the respective robot, and a gripper connected to said rigid arm by a swivel for a second rotational movement about a second axis, the method comprising:
    rotating the rigid arm about the first axis;
    rotating the gripper about the second axis; and
    controlling rotating the gripper with more than one of the robots.

2. The method according to claim 1, further comprising:
    generating instructions for the at least two robots to each simultaneously pick a part;
    generating instructions for the at least two robots to simultaneously move the part; and
    generating instructions for the at least two robots to simultaneously place the part,
    wherein the part is picked, moved and placed by the two robots without altering a rotational orientation of the part, wherein the part is moved in a straight, horizontal line, wherein the grippers of the robots move in a circular path as the part is moved, and wherein picking the part comprises movement of a gripper or gripper arrangement to grasp, grip or otherwise pick a part from a first press.

3. The method according to claim 2, wherein moving the parts comprises moving the part from the first press along a straight and horizontal path parallel to a press line direction to a second press.

4. The method according to claim 3, wherein the part is moved from a first press into a second press.

5. The method according to claim 3, further comprising:
    generating instructions to the at least two robots for movement of a gripper or gripper arrangement back toward the first press along a straight and horizontal path parallel to a press line direction from the second press.

6. The method according to claim 5, further comprising:
    generating instructions to the at least two robots for movement of a gripper or gripper arrangement so as to carry out a synchronising or calibrating routine before picking a next part in the first press.

7. The method according to claim 2, further comprising:
    generating instructions to the at least two robots for at least one movement carried out with a plurality of degrees of freedom about at least two axes.

8. A computer program product, comprising:
    a non-transitory computer readable medium; and
    computer program instructions recorded on the computer readable medium and executable by a processor for control of a system comprising at least two robots for handling parts and a robot control unit arranged for control of said at least two robots, each of said robots being arranged with a parts handler device comprising a rigid arm with one end connected to the respective robot for a first rotational movement about a first axis, the first rotational movement being controlled by the respective robot, and a gripper connected to said rigid arm by a swivel for a second rotational movement about a second axis to carry out a method comprising rotating the rigid arm about the first axis, rotating the gripper about the second axis, and controlling rotating the gripper with more than one of the robots.

9. A system, comprising:
    at least two robots for handling parts, each of said robots being arranged with a parts handler device comprising a rigid arm with one end connected to the respective robot for a first rotational movement about a first axis, the first rotational movement being controlled by the respective robot, and a gripper connected to said rigid arm by a swivel for a second rotational movement about a second axis, the second rotational movement not being controllable by less than two of the robots.

10. The system according to claim 9, wherein said system comprises at least one multi axis robot and an industrial handler with at least two axes of movement.

11. The system according to claim 9, further comprising:
    a sensor and/or a calibrator configured to synchronize or calibrate movement and/or position of the at least two robots.

12. The system according to claim 9, wherein the robot control unit comprises a computer program product comprising a non-transitory computer readable medium and computer program instructions recorded on the computer readable medium and executable by a processor generating the instructions for the at least two robots.

13. The system according to claim 9, wherein the robot control unit comprises memory storage for at least one computer program arranged for control of the at least two robots, said program comprising computer program instructions which, when fed into a computer, will make the computer carry out a method comprising generating instructions for the at least two robots.

14. The system according to claim 9, further comprising:
    a cross member joined to each robot for linking the robots or a gripper or a gripper arrangement of each robot.

* * * * *